United States Patent [19]

Packer

[11] Patent Number: 5,978,575
[45] Date of Patent: *Nov. 2, 1999

[54] REMOTE TERMINAL EMULATOR WITH IMPROVED TIME ACCOUNTING

[75] Inventor: Allan N. Packer, Palo Alto, Calif.

[73] Assignee: Sun Microsystems, Inc., Palo Alto, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/499,186

[22] Filed: Jul. 7, 1995

[51] Int. Cl.$^6$ .................................................. G06F 9/455
[52] U.S. Cl. ................................ 395/500.42; 395/500.45
[58] Field of Search ............................. 395/500; 364/578, 364/419, 550

[56] References Cited

U.S. PATENT DOCUMENTS

| | | | |
|---|---|---|---|
| 5,086,393 | 2/1992 | Kerr et al. | 364/419 |
| 5,109,350 | 4/1992 | Henwood et al. | 364/550 |
| 5,440,697 | 8/1995 | Boegel et al. | 395/500 |
| 5,440,719 | 8/1995 | Hanes et al. | 395/500 |

FOREIGN PATENT DOCUMENTS

| | | | |
|---|---|---|---|
| 0 539 313 A2 | 4/1993 | European Pat. Off. | G06F 13/12 |
| WO 90/10269 | 9/1990 | WIPO | G06F 11/34 |

*Primary Examiner*—Kevin J. Teska
*Assistant Examiner*—Dan Fiul
*Attorney, Agent, or Firm*—Conley, Rose & Tayon, PC; B. Noel Kivlin

[57] ABSTRACT

A remote terminal emulator (RTE) is provided in which substantially all of the time elapsing during an emulated use of a computer system under test is categorized and reported. The time required by the computer system under test to respond to command signals transmitted by the RTE is recorded as a receive time and is measured from completion of the transmission of the command signals to recognition of a pattern specified by the RTE as signifying completion of the response by the computer system under test. As a result, the receive time recorded reflects the time required by the computer system under test to (a) process and carry out the command transmitted by the RTE and (b) transmit response data back to the RTE. The RTE accurately measures and reports the measured user think time to provide important information regard the authenticity of the emulated use, when compared to actual user think times measured during actual use of the computer system under test by actual users, and the relative importance of the processing capacity of the computer system under test. The time during which the RTE processes information, causing emulation of use of the computer system under test to be suspended, is accurately measured as application processing time and is reported to the user of the RTE. Substantially all of the time elapsing during the emulated use of the computer system under test is reported to the user of the RTE to provide the user of the RTE more complete and revealing information regarding the performance of the computer system under test.

8 Claims, 5 Drawing Sheets

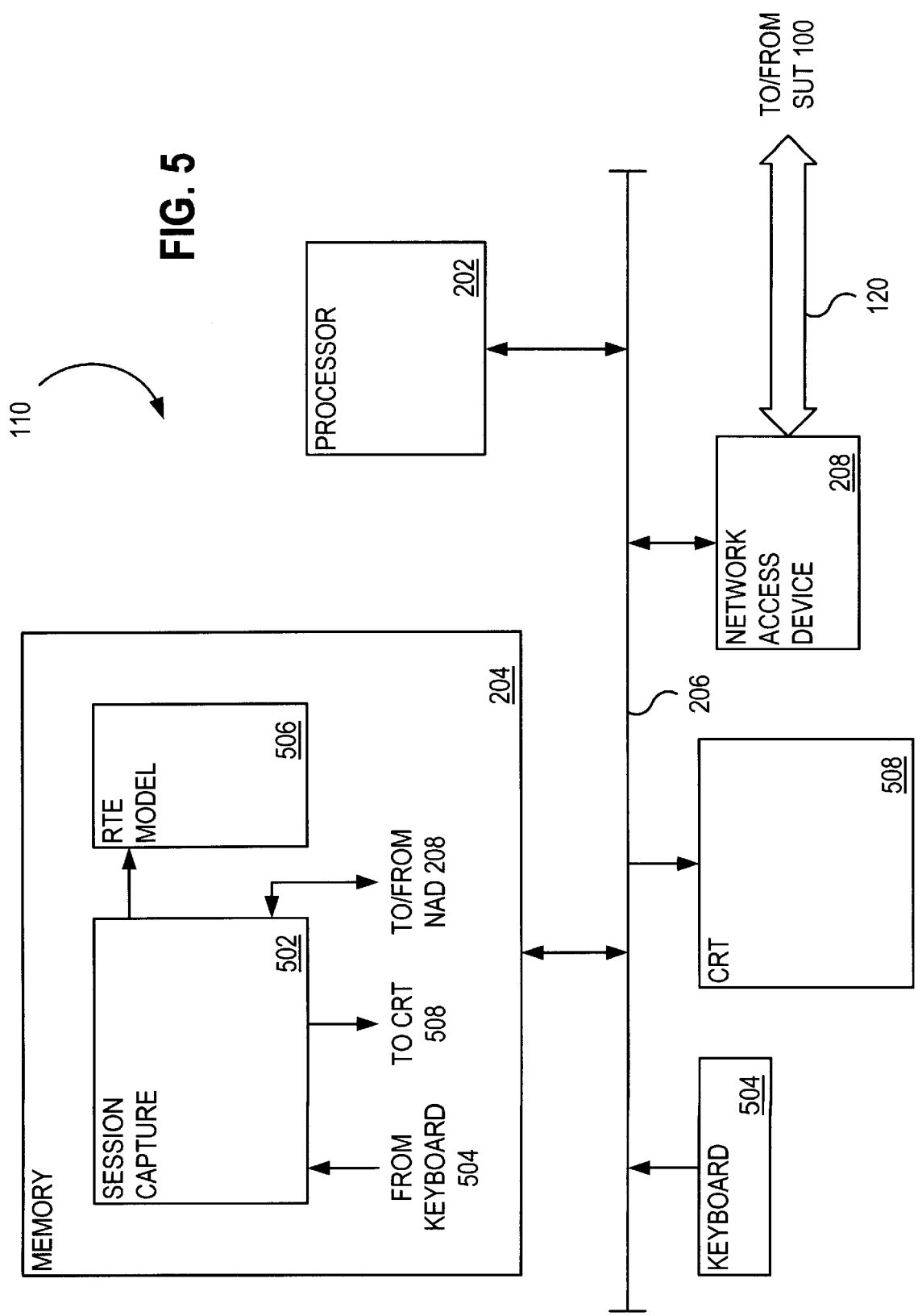

REMOTE TERMINAL EMULATOR WITH IMPROVED TIME ACCOUNTING

FIELD OF THE INVENTION

The present invention relates to a remote terminal emulator and, in particular, to a remote terminal emulator which reports timed components of an emulated user of a computer system under test in a particularly accurate and complete manner and in which substantially all time of an emulation is accounted for and reported to a user.

BACKGROUND OF THE INVENTION

A remote terminal emulator (RTE) simulates use of a computer system under test by a user through a remotely coupled terminal. An RTE is used to test the computer system under test for such purposes as quality assurance and quantitative comparisons between respective computer systems. For example, a computer system under test may be designed to process data according to commands entered by multiple users simultaneously through multiple terminals coupled remotely to the computer system under test. Such a computer system can be tested without the assistance of actual users by simultaneous execution of RTEs which collectively simulate simultaneous use of the computer system under test by multiple users. Testing computer systems without the assistance of actual users has become an important component of the development of computer systems since such testing can be performed for very long periods of time and at times when other use of the computer system under test is typically light, e.g., over night. In addition, RTEs can be used to replicate identical operating environments in two or more respective computer systems to compare relative performance characteristics of the respective computer systems.

It is important that the simulation of an RTE of use of the computer system under test be as accurately reflective as possible of actual use of the computer system under test by an actual user. Otherwise, conclusions regarding performance characteristics of the computer system under test drawn from information obtained by emulated use effected by the RTE can be erroneous or inaccurate. As a result, evaluation of the computer system under test can result in over-estimation or under-estimation of the requisite computer system configuration to perform a particular task. For example, if the performance of the computer system under test is reported by an RTE overly optimistically, a systems administrator may configure the computer system under test with a central processing unit which is too slow to meet the systems administrator's needs when actually used. Conversely, if the performance of the computer system under test is reported by an RTE overly pessimistically, a systems administrator may unnecessarily increase the processing capacity of the computer system under test thereby incurring an unnecessary expense.

Typically, an RTE which emulates a remote terminal coupled to a computer system under test is a computer process executing on a second computer system, which is remotely coupled to the computer system under test. Such a computer process is sometimes called an RTE process. The RTE process transmits command signals to the computer system under test as if the command signals were entered through a remote terminal by an actual user of the computer system and receives resulting output data from the computer system under test. Simultaneous use by multiple users of a multi-user computer system under test is emulated using a remotely coupled computer system and multiple RTE processes which execute concurrently on the remotely coupled computer system.

RTEs are used to evaluate computer systems and, in general, performance characteristics such as response times and throughput for such computer systems. However, currently available RTEs provide insufficient information regarding the performance of a particular computer system under test to make specific, important conclusions regarding under the performance. For example, conventional RTEs provide insufficient information regarding an emulated use of a computer system under test to determine what proportion of the time elapsing during the emulated use reflects processing by the computer system under test or what proportion of the time elapsing during the emulated use reflects administrative processing by the RTE. As a result, conclusions, such as the sufficiency of the processor of the computer system under test to perform a particular task, cannot be derived from such conventional RTEs with confidence.

What is therefore needed is an RTE which realistically simulates actual use of a computer system under test by a user and which reports sufficient information regarding the performance of the computer system under test to support specific, important conclusions regarding the performance.

SUMMARY OF THE INVENTION

In accordance with the present invention, an RTE is provided in which the time required by the computer system under test to respond to command signals transmitted by the RTE is recorded as a receive time and is measured from completion of the transmission of the command signals to recognition of a pattern specified by the RTE as signifying completion of the response by the computer system under test. As a result, the recorded receive time reflects the time required by the computer system under test to (a) process and carry out a command specified by the command signals transmitted by the RTE and (b) transmit resulting output data back to the RTE. The recorded receive time is therefore accurately reflective of the proportion of time elapsing during an emulated use of the computer system under test devoted to processing by the computer system under test and therefore supports more conclusively a conclusion regarding the sufficiency of the processing capabilities of the computer system under test.

Further in accordance with the present invention, the RTE accurately measures and reports user think time and application processing time. The RTE determines an amount of time during which transmission of data to the computer system under test is suspended to emulate thinking by a user of the computer system under test. The RTE suspends transmission of command signals to the computer system under test and measures and records as user think time the actual amount of time during which transmission of command signals is suspended. The user think time is then reported to the user of the RTE to provide more complete information regarding the emulated use of the computer system under test. Specifically, accurately measuring and reporting user think time provides important information regard the authenticity of the emulated use, when compared to actual user think times measured during actual use of the computer system under test by actual users, and the relative importance of the processing capacity of the computer system under test.

An RTE typically performs logic operations and other processing ill emulating use of the computer system under test. For example, an RTE can recognize one of a number of patterns in data received from the computer system under test and perform one of a number of tasks depending upon which of the patterns is recognized. In accordance with the present invention, the time during which the RTE processes information, causing emulation of use of the computer system under test to be suspended, is accurately measured as application processing time and is reported to the user of the RTE. The application processing time provides to the user an indication of the influence of the RTE itself on the emulated use of the computer system under test.

Further in accordance with the present invention, the RTE measures each occurrence during an emulated use of the computer system under test to a single, consistent precision. The RTE reports the measured times of the components of the emulated use of the computer system under test to the same precision. Substantially all of the time elapsing during the emulated use of the computer system under test is reported to the user of the RTE to provide the user of the RTE more complete and revealing information regarding the relative performance of the computer system under test during emulated use of the computer system under test.

BRIEF DESCRIPTION OF THE DRAWINGS

FIG. 5 is a block diagram of a session capture process which is used to generate the RTE process of FIG. 3.

DETAILED DESCRIPTION

Figure 1:
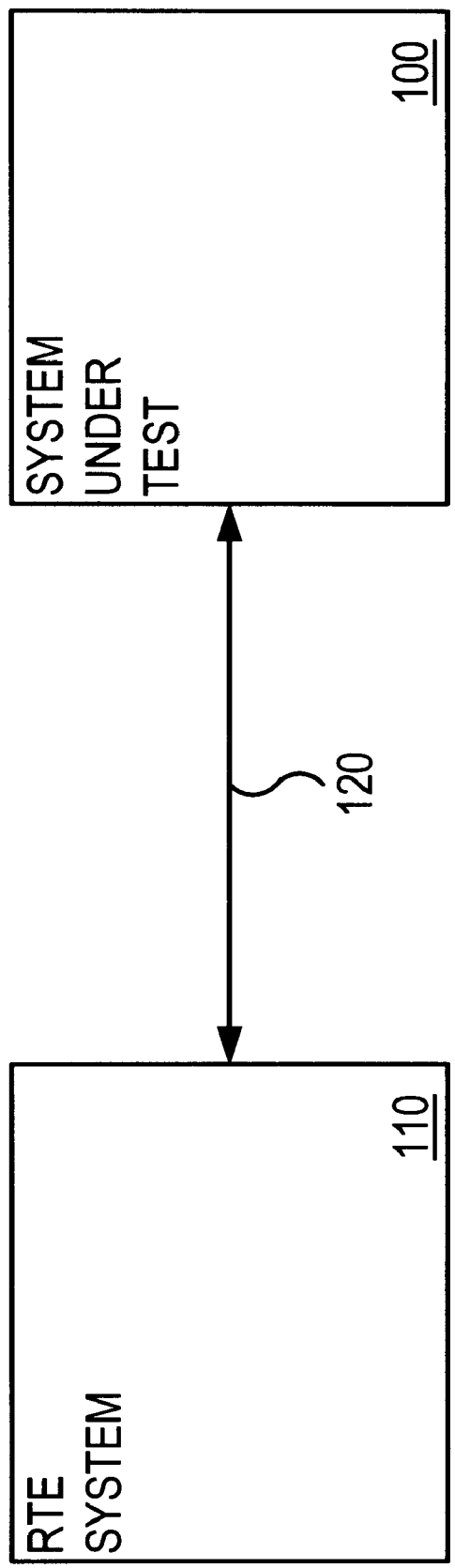
FIG. 1 is a block diagram of an RTE system and a computer system under test.

Greater accuracy in ascertaining the relative performance of a computer system under test 100 (FIG. 1) is provided by a remote terminal emulator (RTE) system 110 in accordance with the present invention. RTE system 110 accurately measures and reports user think time, application processing time, and time required by computer system under test 100 to respond to command signals received from RTE system 110. Substantially all of the time elapsing during an emulated use of computer system under test 100 by RTE system 110 is accounted for and reported to the user of RTE system 110 such that the user can make more conclusive assessments of the relative performance of computer system under test 100.

Computer system under test 100, which is sometimes called "SUT" 100, is a multi-user computer system which supports multiple computer processes executing within SUT 100 concurrently. Each of one or more actual users of SUT 100 controls one or more computer processes executing within SUT 100 through a remotely coupled terminal, through which the user sends command signals to SUT 100 and receives resulting output data from SUT 100. Simultaneous use by multiple users through multiple respective remotely coupled terminals is simulated by RTE system 110, which sends commands signals to and receives resulting output data from SUT 100 through a connection 120. Connection 120 can be, for example, a standard Ethernet connection.

Figure 2:
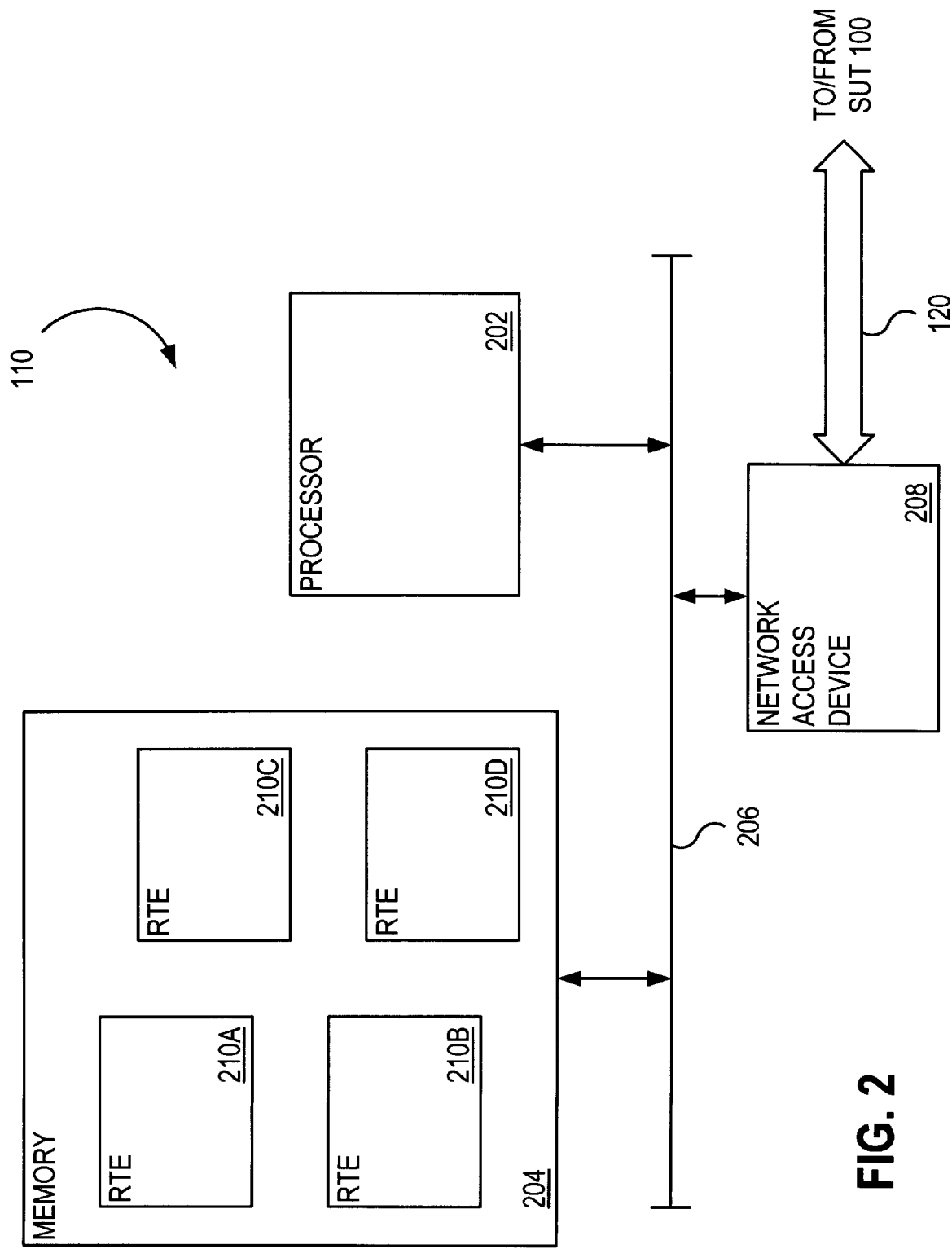
FIG. 2 is a block diagram of an RTE system in accordance with the present invention.

RTE system 110 is shown in greater detail in FIG. 2. RTE system 110 includes a processor 202 which is coupled to a memory 204 through a bus 206. Memory 204 can include generally any type of memory including, without limitation, randomly-accessible memory (RAM), read-only memory (ROM), and magnetic and optical storage devices such as magnetic disks and magnetic tape. Processor 202 fetches from memory 204 and executes computer instructions. Processor 202 also reads data from and writes data to memory 204. Memory 204 includes RTE processes 210A–D, each of which is a computer process executing in processor 202 from memory 204. RTE processes 210A–D execute in RTE system 110 concurrently in a conventional manner.

In accordance with computer instructions of RTE processes 210A–D, processor 202 transmits command signals to SUT 100 through bus 206, a network access device 208, and connection 120. Similarly, network access device 208, which includes network interface circuitry, receives resulting output data from SUT 100 through connection 120 and transmits those resulting output data to processor 202 through bus 206. Processor 202 forwards received resulting output data to the one of RTE processes 210A–D to whose command signals the received resulting output data corresponds. Network access device 208 can be, for example, network interface circuitry which implements the standard Ethernet network protocol. Processor 202, memory 204, bus 206, and network access device 208 can be, for example, components of a computer workstation such as the SPARCstation workstation computer available from Sun Microsystems, Inc. of Mountain View, Calif.

Each of RTE processes 210A–D simulates, through processor 202 and network access device 208, use of SUT 100 by a single user through a remotely coupled terminal. RTE processes 210A–D are analogous to one another. Accordingly, the following description of RTE process 210A is equally applicable to each of RTE processes 210B–D. RTE process 210A is shown in greater detail in FIG. 3 and is formed generally in three steps.

In a first step, which is generally conventional and is described herein for completeness, a user accesses SUT 100 through a session capture process 502 (FIG. 5).

Session capture process 502 is a computer process executing within RTE system 110 which records command signals generated by the user and corresponding resulting output data which indicates completion of the task of SUT 100 directed by the command signals generated by the user. Specifically, the user enters command signals to be transmitted to SUT 100 using, for example, a keyboard 504. Command signals generated by the user can also include, for example, signals resulting from the user moving or actuating a pointing device (not shown) such as an electronic mouse. The command signals are received through bus 206 by session capture process 502 which records the command signals in an RTE model 506 and transmits the command signals to SUT 100 through network access device 208. When SUT 100 responds to the command signals by transmiitting to network access device 208 resulting output data, the output data is transmitted to session capture process 502. Session capture process 502 selects a relatively unique pattern from at or near the end of the resulting output data and records the selected pattern in RTE model 506. Session capture process 502 also transmits the resulting output data to an output device, e.g., CRT 508, for display of the resulting output data to the user. This first step is generally referred to as capturing keystrokes and is conventional.

Figure 3:
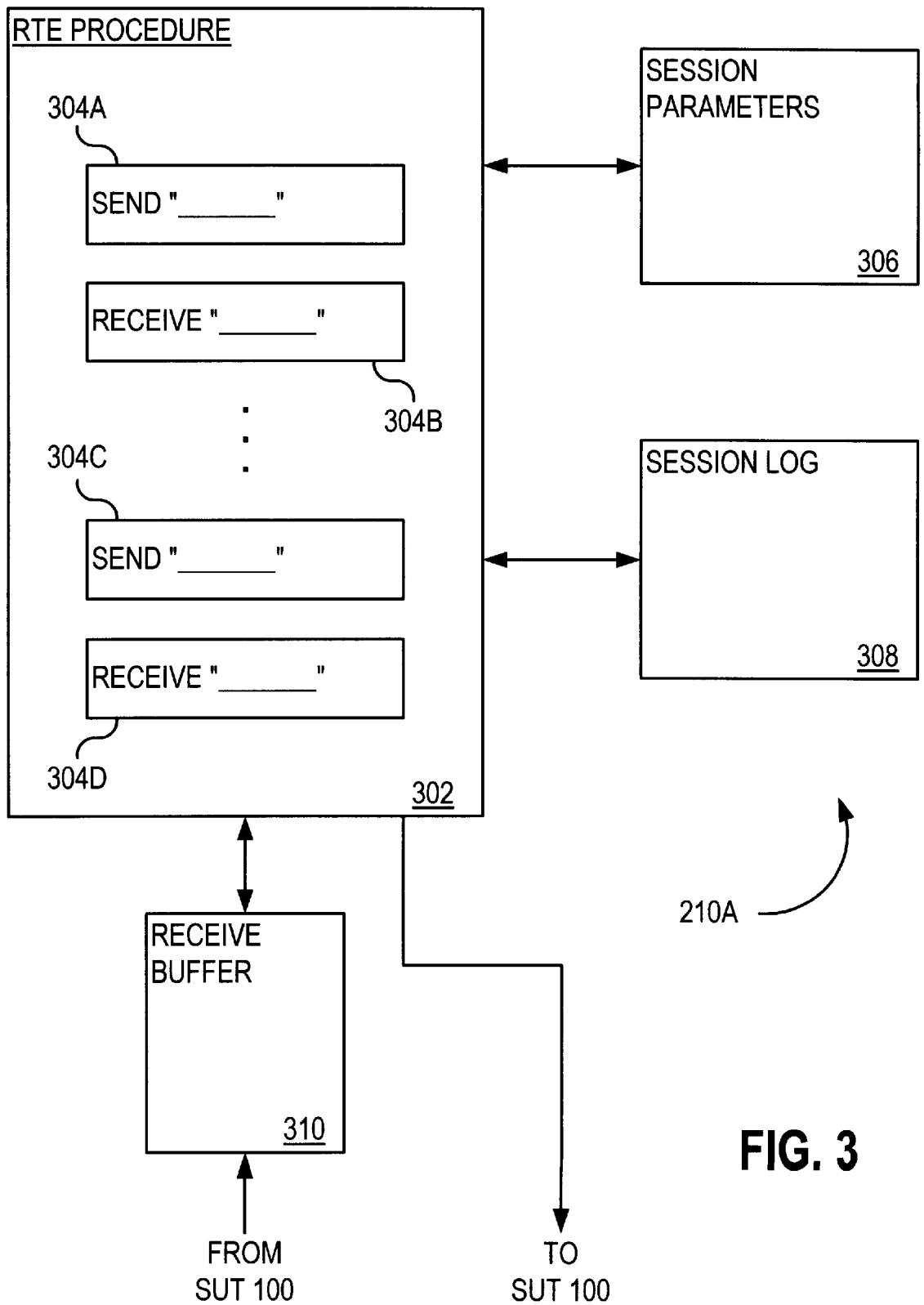
FIG. 3 is a block diagram of an RTE process in accordance with the present invention.

Continuing in the first step, an RTE procedure 302 (FIG. 3) of RFE process 210A is derived from the captured keystrokes. Specifically, RTE procedure 302 is derived from RTE model 506 (FIG. 5) and includes a number of "send"

computer instructions, e.g., send computer instructions 304A (FIG. 3) and 304C, and a number of "receive" computer instructions, e.g., receive computer instructions 304B and 304D. Send computer instructions 304A and 304C, when executed, each send to SUT 100 a series of command signals which collectively form a single command entered by the user as recorded in RTE model 506 (FIG. 5). Receive instructions 304B (FIG. 3) and 304D, when executed, each scan data received from SUT 100 for a particular pattern, as stored in RTE model 506 (FIG. 5) which indicates that all, or substantially all, of the resulting output data corresponding to the most recently sent command signals have been received from SUT 100. In capturing keystrokes, command signals generated by the user are grouped into single, complete commands and, for each such command, a send computer instruction is included in RTE procedure 302 (FIG. 3). In addition, a unique pattern is selected from the end or nearly the end of the resulting output data received from SUT 100 in response to the command sent. A receive Computer instruction specifying the selected pattern is included in RTE procedure 302, typically immediately following the corresponding send computer instruction.

In the second step, parameters which define characteristics of the simulation by RTE process 210A of use by a user of SUT 100 are established and recorded. Such parameters include (1) the rate at which a user generates input signals, (2) the amount of time the user takes to review received resulting output data before beginning to generate input signals, (3) the amount of time the user thinks about the received resulting output data before beginning to generate input signals, and (4) the minimum time required for the user to generate a specified set of input signals. The first parameter is, in general, the speed at which the user types and is, in one embodiment, expressed in terms of keyboard keystrokes per second. The second parameter is referred to as a review time and simulates the user reading, reviewing, and taking time to understand resulting output data which is displayed on the terminal used by the user. The second parameter typically specifies a random distribution of review times since different users require varying amounts of time to review any particular resulting output data. The third parameter is referred to as a user think time and simulates thinking by the user regarding what input signals to generate in response to the displayed resulting output data. The third parameter typically specifies a random distribution of user think times since different users require varying amounts of time to think prior to issuing command signals in response to any particular resulting output data. The fourth parameter is referred to as a transaction user think time and is used to simulate a task performed by the user in which a minimum amount of time is required to perform the task without regard to (i) how fast the user can type, read, and think or (ii) how fast SUT 100 processes command signals and returns resulting output data. For example, a user may be required to turn pages or physically move papers on a desk between reviewing output data and generating input signals and such actions may require a minimum amount of time to be accomplished. A transaction is defined by the developer of RTE process 210A to be a collection of components of RTE process 210A to which a transaction user think time is applicable. Specific values for these parameters are ascertained, in one embodiment, by observing actual use of SUT 100 by actual users and measuring the times represented by the parameters during such actual use. These times are typically measured repeatedly during several actual uses to provide a sufficient number of samples to generate random distributions which accurately reflect actual use of SUT 100. The above-listed parameters, once corresponding specific values are ascertained, are stored in a session parameters database 306 of RTE process 210A.

In the third step, the computer instructions formed in the first step described above are combined with other computer instructions and the parameters recorded in the second step described above to form a computer program which, when executed, forms RTE process 210A. During execution, RTE process 210A records components of event, in a session log 308. Event components recorded in session log 308 include beginning and ending of major and minor events, beginning and ending of performance of send and receive computer instructions, beginning and duration of user think times, beginning and duration of review times, beginning and ending of freeze times during which processing of RTE process 210A is suspended, and beginning and ending of transactions. The relative performance of SUT 100 is later evaluated from the event components recorded in session log 308. The time at which each and every event component recorded in session log 308 is recorded to a single, uniform precision which is, in one embodiment, one one-thousandth of a second. All times are recorded to a uniform precision so that substantially all time which elapses during execution of RTE process 210A can be accounted for. The accounting for time during an execution of RTE process 210A and the corresponding analysis of the performance of SUT 100 are described more completely below.

RTE process 210A includes a receive buffer 310 in which are stored resulting output data received from SUT 100 as a result of command signals transmitted to SUT 100. During execution of a receive computer instruction, e.g., receive computer instruction 304B, RTE process 210A compares data stored in receive buffer 310 with the pattern specified in the receive computer instruction. When the pattern specified in receive computer instruction 304B is matched, the completion of receive computer instruction 304B is recorded in session log 308 along with the time at which receive computer instruction 304B completed. When the pattern specified in receive computer instruction 304B is matched, receive buffer 310 can include output data received from SUT 100 after receipt of the matched pattern.

Conventional RTEs clear a receive buffer only up to the matched pattern. However, it is possible that the pattern specified in receive computer instruction 304D is matched in the portion of receive buffer 310 which follows the pattern matched in execution of receive computer instruction 304B. If such is the case and receive buffer 310 is cleared only up to the pattern matched in execution of receive computer instruction 304B, execution of receive computer instruction 304D would immediately complete as the pattern specified therein is immediately matched in data remaining in receive buffer 310. As a result, RTE process 210A would erroneously record in session log 308 that SUT 100 took essentially no time at all to respond to the command signals transmitted to SUT 100 in execution of send computer instruction 304C. Therefore, RTE process 210A clears receive buffer 310 entirely when the pattern specified in receive computer instruction 304B is matched in receive buffer 310.

Once RTE process 210A is formed as described above, RTE process 210A is executed in RTE system 110 to simulate use of SUT 100 by a user of SUT 100 through a remotely coupled terminal. Several test executions of RTE process 210A can be used to compare throughput, i.e., the number of executions of RTE process 210A that can be completed in a period of time, to throughput of actual use of SUT 100 by one or more actual users of SUT 100 to determine whether the various parameters described above and stored in session parameter database 306 are properly chosen. Once the parameters are verified, RTE process 210A can be used to simulate use of SUT 100 by an actual user of SUT 100. Several RTE processes which are identical to RTE process 210A can execute concurrently within RTE system 110 to simulate several users performing identical tasks on SUT 100 simultaneously. Several RTE processes which simulate different tasks, e.g., RTE processes 210B–D, can be created in a manner directly analogous to the creation of RTE process 210A as described above. These RTE processes can execute concurrently with RTE process 210A in RTE system 110 to simulate use of SUT 100 by several users performing different tasks on SUT 100 simultaneously. Such RTE processes execute, individually or concurrently with other such RTE processes, within RTE system 110 to simulate use of SUT 100 by one or many users, respectively.

After execution of RTE process 210A, a report is generated from event components recorded in session log 308 and the report is studied by a user of RTE system 110 to evaluate performance of SUT 100 during execution of RTE process 210A. An exemplary report
generated from a session log such as session log 308 is attached hereto as Appendix A. In the report of Appendix A, each event is reported individually. The user of RTE system 110 who constructs RTE process 210A as described above and who is sometimes referred to herein as the developer of RTE process 210A groups event components into events which are delimited 5 within RTE procedure 302 by begin event computer instructions and end event computer instructions. An event is typically a series of corresponding send and receive commands which collectively define a task. A transaction is a specific type of event described above and is delimited within RTE procedure 302 by begin transaction computer instructions and end transaction computer instructions. The beginning and end of each event of RTE process 210A are time stamped and recorded in session log 308 as event components.

For each event, the total number of occurrences of the event during an execution of RTE process 210A is reported. Furthermore, average elapsed times are reported for the following components of the event (which appears under the heading "Total" in the report of Appendix A): (i) total time from beginning to end of the event (which appears under the heading "Total" in the report of Appendix A), (ii) total review time during the event (which appears under the heading "Review" in the report of Appendix A), (iii) total user think time during the event (which appears under the heading "Think" in the report of Appendix A), (iv) total transaction user think time (which appears under the heading "TranTh" in the report of Appendix A), (v) total time required for processing by RTE process 210A and otherwise not accounted for during the event (which appears under the heading "Appln" in the report of Appendix A), (vi) total time elapsing during send and receive computer instructions of the event (which appears under the heading "Send/Recv" in the report of Appendix A), (vii) total time elapsing during send computer instructions during the event (which appears under the heading "Send" in the report of Appendix A), and (viii) total time elapsing (luring receive computer instructions during the event (which appears under the heading "Recv" in the report of Appendix A). In addition to average elapsed times, the following statics are reported for each of the above-listed times: (i) standard deviation (which is labeled "Std.Dev" in the report of Appendix A), (ii) coefficient of variation (which is labeled "C.O.V." in the report of Appendix A), (iii) the minimum time (which is labeled "Low" in the report of Appendix A), (iv) the maximum time (which is labeled "High" in the report of Appendix A), and (v) one or more user-selectable percentiles, e.g., the ninetieth percentile (which is labeled "90% ile" in the report of Appendix A).

The total time from beginning to end of an event, which is sometimes referred to herein as the "event time", is helpful in determining how much time is spent by a user in a particular event relative to the remainder of the task which includes the event. Event time is also generally helpful in determining whether simulation of the event is generally accurate by comparing the event time with actual event times measured during use of SUT 100 by actual users. However, event time alone is not particularly helpful in determining whether individual parameters stored in session parameters 306 are accurately reflective of actual use of SUT 100. Furthermore, event time alone is not particularly indicative of the effect on event time of the particular processing capabilities of SUT 100. For example, a long event time provides insufficient information to determine what effect upgrading the processor (not shown) of SUT 100 would have on the event time or the overall throughput of SUT 100 when actually used.

Total review time, user think time, and transaction user think time during an event provide information regarding review times, user think times, and transaction user think times actually used by RTE process 210A in a random distribution of review, think, and transaction user think times according to parameters stored in session parameters 306 as described above. Total review time, user think time, and transaction user think time during an event generally indicate whether parameter defining the random distribution of review time and user think time, respectively, are accurately selected. In fact, without knowing review time, user think time, and transaction user think time as actually used by RTE process 210A in emulating the use of SUT 100, it is particularly difficult to determine whether such parameters are accurately selected. Total review time, user think time, and transaction user think time during an event are also generally indicative of the amount of time elapsing during components of an event unrelated to performance characteristics of SUT 100 and related instead to human, e.g., ergonomic or user-interface, components of the event.

Total time elapsing during send and receive computer instructions of the event, which is sometimes referred to herein as "send/receive time", is generally equal to the sum of the total time elapsing during send computer instructions of the event and the total time elapsing during receive computer instructions of the event, which are sometimes referred to herein as "send time" and "receive time", respectively. Some conventional RTE systems only report send/receive time and throughput and various statistics for each. Send/receive time alone is at best roughly indicative of the relative performance of SUT 100 and is at best roughly indicative of throughput for a given event.

As described above, send computer instructions replicate manual generation and transmission of command signals by a user through use of a computer input device such as a keyboard. As a result, send time, which is a component of send/receive time, is generally not indicative of the relative performance of SUT 100. Send time is more indicative of the speed with which the simulated user types, the complexity of the command which the simulated user is required to enter, and, correspondingly, the effectiveness of the user-interface by which the simulated user interacts with SUT 100.

Receive time is particularly indicative of the relative performance of SUT 100. Receive time indicates the amount of time elapsing between completion of the most recently completed send computer instruction and the matching of the pattern specified for the current receive computer instruction and is therefore a particularly good indicator of the amount of time taken by SUT 100 to respond to the most recently completed send computer instruction. All other components of the total elapsed time of an event are independent of performance characteristics of SUT 100. Reporting send time in conjunction with send/receive time and receive time provides to the system evaluator confidence in accuracy of the reported times and that all time has been accounted for.

Total time required for processing by RTE process 210A and which elapses but is otherwise not accounted for during the emulated use of SUT 100 is sometimes referred to herein as "application processing time". Application processing time reflects processing by RTE process 210A in performing such tasks as organizing send and receive computer instructions into major and minor events, maintaining data structures for representing and recording performance of such events, monitoring receive buffer 310 for patterns specified in receive computer instructions, and performing logical operations and computer instructions to determine which of the computer instructions of RTE process 210A to next execute. The last task occurs when the next send computer instruction executed within RTE process 210A depends on which of a number of patterns is matched in data received from SUT 100. Application processing time is an indication of the amount of overhead processing resulting from the relative complexity of RTE process 210A. Excessive complexity in RTE process 210A, which results in a particularly large amount of application processing time, indicates that such complexity in RTE process 210A affects, and potentially interferes with, the simulation effected by RTE process 210A and reported in the report of Appendix A. If application processing time is reported as a significant time component of an event, the computer instructions of RTE process 210A can be reorganized to make processing by RTE process 210A more efficient and to reduce influence of overhead processing by RTE process 210A on the results reported in the report of Appendix A. Accurately measuring and reporting application processing time provides to a user of RTE system 110 who analyzes the results reported in the report of Appendix A confidence that substantially all time elapsing during execution of RTE process 210A is accounted for and accurately reported. Furthermore, confidence that overhead processing by RTE process 210A does not excessively influence the emulated use of SUT 100 by RTE process 210A is bolstered by accurately measuring and reporting application processing time.

Figure 4:
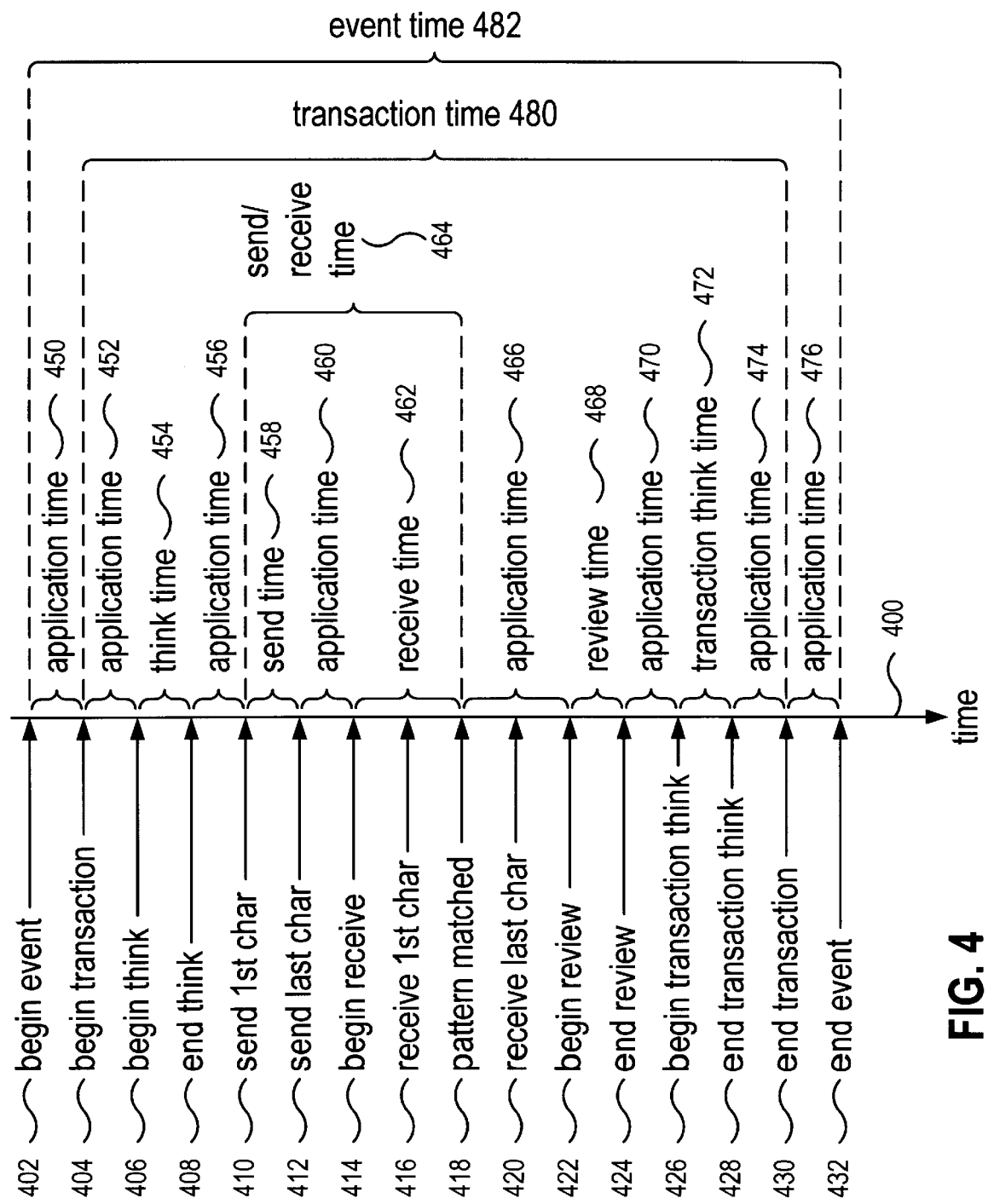
FIG. 4 is a timeline diagram representing event components logged during an execution of the RTE process shown in FIG. 3.

FIG. 4 shows a time line 400 representing execution of RTE process 210A (FIG. 3) as recorded in session log 308. Along time line 400 (FIG. 4), a number of log entries 402–432 represent occurrences recorded in session log 308 (FIG. 3) during execution of RTE process 210A. Each of log entries 402–432 (FIG. 4) are recorded along with the time at which the recorded occurrence occurred. Such is commonly called "time stamping" the occurrence. The log entries shown in FIG. 4 collectively form a simple event which includes a single send computer instruction and a single receive computer instruction. Log entry 402 records performance of a begin event computer instruction in which RTE process 210A (FIG. 3) records the beginning of an event. Soon thereafter, log entry 404 (FIG. 4) records performance of a begin transaction computer instruction in which RTE process 210A (FIG. 3) records the beginning of a transaction. The difference between the times at which log entries 402 (FIG. 4) and 404 are recorded is categorized as application processing time 450.

Shortly after log entry 404, RTE process 210A initiates a think timer (not shown) and records initiation of the think timer in session log 308 as log entry 406 (FIG. 4). Any passing time between log entries 404 and 406 is recorded as application processing time 452. Application processing time 452, and all application processing time shown in FIG. 4, is typically insignificant but is measured nonetheless to provide to the user ojrRTE process 210A (FIG. 3) complete information regarding the simulation performed by RTE process 210A and confidence in the reported results by accounting for substantially all of the time elapsing during an execution of RTE process 210A.

As described above, user think time, e.g., user think time 454, simulates time required by a simulated user to think prior to taking action. RTE process 210A (FIG. 3) initiates a think timer (not shown) and such initiation is recorded in session log 308 as log entry 406 (FIG. 4). When the think timer expires, RTE process 210A stores log entry 408 in session log 308 (FIG. 3) to record completion of the simulated thinking by the simulated user. The difference in time between log entries 406 (FIG. 4) and 408 is measured as user think time 454 to accurately reflect the actual amount of time spent by RTE process 210A (FIG. 3) to simulate thinking by a user. In reporting performance characteristics of a system under test, some conventional RTE systems use the amount of user think time that is specified in a computer instruction which effects a simulated thinking by a user. However, the amount of time spent by an RTE process simulating thinking and the amount of user think time so specified can differ, and reported user think time in such conventional RTE systems can be inaccurate.

Once the think timer has expired, the expiration of the think timer is recorded in session log 308 (FIG. 3) as log entry 408 (FIG. 4), user think time 452 is calculated as described above, and processing by RTE process 210A (FIG. 3) continues. In the event shown in FIG. 4, an send computer instruction, e.g., send computer instruction 304A (FIG. 3), executes substantially immediately after expiration of the think timer. Log entry 410 records the transmission of the first character of the send computer instruction. The difference between the times at which log entries 408 (FIG. 4) and 410 are recorded is categorized as application processing time 456.

Log entry 412 records transmission by RTE process 210A (FIG. 3;) of the last character of a send computer instruction, e.g., send computer instruction 304A. The time recorded in session log 308 for log entry 410 (FIG. 4) is subtracted from the time recorded in session log 308 (FIG. 3) for log entry 412 (FIG. 4) and the resulting time is the difference between the time of transmission of the last and first characters of a send computer instruction. Accordingly, the resulting time is categorized as send time 458.

Receive time 462 is the difference in time between log entry 414, which substantially immediately follows transmission of the last character of the most recently completed send computer instruction of RTE process 210A (FIG. 3), e.g., send computer instruction 304A, and log entry 418 (FIG. 4), which is the matching of the pattern specified in a receive computer instruction, e.g., receive computer instruction 304B (FIG. 3). Some conventional RTE systems which report receive time separately from send/receive time measure receive time between the beginning of receive, shown at log entry 414, and receipt of the first character of a receive computer instruction, shown at log entry 416 (FIG. 4). In such conventional RTE systems, receive time is not an accurate indication of the relative performance characteristics of SUT 100 (FIG. 3) since total time during which SUT 100 processes data and commands received as a result of the most recently completed send computer instruction is not reported. Specifically, SUT 100 can respond relatively quickly to a send computer instruction with resulting output data which substantially immediately informs the emulated user that processing will continue for a period of time and that patience is warranted. For example, such resulting output can be in the form of a textual message such as "Processing . . . Please wait . . . " Such resulting output data does not indicate that SUT 100 has completed processing the most recently transmitted data but rather indicates that processing of the data has just begun. By not including time between such a message and the matching of the pattern which at subsantially all of the resulting output data has been received, conventional RTEs can misreport receive time. Accordingly, time elapsing between log entry 416 (FIG. 4) and log entry 418 represents time during which SUT 100 (FIG. 3) continues to processes data and commands received from RTE system 110 as a result of execution of a send computer instruction by RTE process 210A and such elapsed time is recorded in RTE process 210A as part of receive time in accordance with the present invention.

Since receive time 462 (FIG. 4) includes time elapsing while SUT 100 (FIG. 2) processes command signals transmitted to SUT 100, i.e., time elapsing between log entries 414 (FIG. 4) and 418, receive time 462 is related in a significant way to the particular performance characteristics of SUT 100. For example, significantly increasing the processing capacity of SUT 100 results in a corresponding significant decrease in the time difference between log entries 414 and 418 and therefore in receive time 462. However, significantly increasing the processing capacity of SUT 100 has little or no effect on the time required for the user to generate and transmit to SUT 100 command signals, to review resulting output data, or to think to determine what command signals to next generate and transmit to SUT 100. Accordingly, significantly increasing the processing capacity of SUT 100 can have relatively little effect on the throughput of SUT 100 depending largely on the proportion of tasks executed by SUT 100 categorized as receive times, e.g., receive time 462. Thus, categorizing receive times as such and reporting receive times apart from other components of an event provides a user of RTE system 110 (FIG. 2) with valuable and crucial information regarding the potential effect of upgrading hardware components of SUT 100.

Send time 458 (FIG. 4) and receive time 462 are combined to form send/receive time 464. Application processing time 460 is the time elapsing between log entry 412, which is the transmission of the last character of a send computer instruction, and log entry 414, at which RTE process 210A (FIG. 3) begins monitoring receive buffer 310 for the pattern specified in the receive computer instruction. Typically, application processing time 460 (FIG. 4) will be very small and relatively insignificant. However, it is preferred that application processing time 460 is shown as part of event time 482 to accurately report the time required by SUT 100 to process the data and commands transmitted by RTE system 110 during the most recently executed send computer instruction.

As described above, review time, e.g., review time 468, simulates review by a user of received output data prior to action taken by the user in response to such data. RTE process 210A (FIG. 3) initiates a review timer (not shown) shortly after log entry 420 (FIG. 4), which indicates completion of a receive computer instruction. Initiation of the review timer is recorded in session log 308 (FIG. 3) as log entry 422 (FIG. 4). When the review timer expires, RTE process 210A (FIG. 3) stores log entry 424 (FIG. 4) in session log 308 (FIG. 3) to record completion of the simulated review of received data by the simulated user. The difference in time between log entries 422 (FIG. 4) and 424 is measured as review time 468 to accurately reflect the actual amount of time spent by RTE process 210A (FIG. 3) to simulate review of received data by a user. Some conventional RTE systems report the amount of review time that is specified in a computer instruction which effects a simulated review of received data by a user. However, the amount of time spent by an RTE process simulating review of received data and the amount of review time so specified can differ, and reported review time in such conventional RTE systems can be inaccurate.

Prior to initiation of the review timer as recorded by log entry 422 (FIG. 4) in session log 308 (FIG. 3) and after matching of the pattern specified in the most recently performed receive computer instruction, e.g., receive computer instruction 304B, as recorded by log entry 418 (FIG. 4) in session log 308 (FIG. 3), RTE process 210A clears receive buffer 310. If the developer of RTE process 210A has specified in receive computer instruction 304B a pattern near or at the end of the data received from SUT 100, receive buffer will be cleared after receipt of the last character as represented by time 420 (FIG. 4).

Shortly after termination of the simulated review, which is recorded in session log 308 as log entry 424 (FIG. 4), RTE process 210A (FIG. 3) determines the amount of time which has elapsed since execution of the begin transaction computer instruction recorded by log entry 404 in session log 308 (FIG. 3) and compares the elapsed time of the transaction to a transaction user think time specified in the begin transaction computer instruction. As described above, transaction user think time is used to simulate a task performed by the user in which a minimum amount of time is required to perform the task without regard to (i) how fast the user can type, read, and think or (ii) how fast SUT 100 processes command signals and returns resulting output data. Since transaction user think time represents a minimum transaction time, RTE process 210A (FIG. 3) only uses transaction user think time if less than the minimum transaction time has elapsed since execution of the begin transaction computer instruction recorded by log entry 404 in session log 308. If less than the minimum transaction time has elapsed, RTE process 210A initiates a transaction think timer (not shown) to expire when the minimum transaction time has elapsed since execution of the most recently executed begin transaction computer instruction and records initiation of the transaction think timer in session log 308 as log entry 426 (FIG. 4). Any passing time between log entries 424 and 426 is recorded as application processing time 470. Application processing time 470 is typically insignificant but is measured nonetheless to provide to the user of RTE process 210A (FIG. 3) complete information regarding the simulation performed by RTE process 210A and confidence in the reported results by accounting for substantially all of the time elapsing during an execution of RTE process 210A.

When the think timer expires, RTE process 210A stores log entry 428 in session log 308 (FIG. 3) to record accurately the amount of transaction user think time used in the simulated use of SUT 100 by RTE process 210A. The difference in time between log entries 426 (FIG. 4) and 428 is measured as transaction user think time 472 to accurately reflect the actual amount of time spent by RTE process 210A (FIG. 3) to implement the minimum transaction time.

In the event shown in FIG. 4, an end transaction computer instruction executes substantially immediately after expiration of the transaction think timer, and terminates the transaction. The termination of the transaction is recorded in session log 308 (FIG. 3) as log entry 430 (FIG. 4). Any time elapsing between log entries 428 and 430 is categorized as application processing time 474 and is typically insignificant. When the event shown in FIG. 4 is terminated as recorded in log entry 432, the time elapsing between log entries 404 and 430, which record the beginning and end, respectively, of a transaction, is categorized as transaction time 480.

An end event computer instruction executes substantially immediately after termination of the transaction, and terminates the event. The termination of the event is recorded in session log 308 (FIG. 3) as log entry 432 (FIG. 4). Any time elapsing between log entries 430 and 432 is categorized as application processing time 476 and is typically insignificant. When the event shown in FIG. 4 is terminated as recorded in log entry 432, the time elapsing between log entries 402 and 432, which record the beginning and end, respectively, of the event of FIG. 4, is categorized as event time 482. Event time 482 is equal to the sum of user think time 454, send time 458, receive time 462, review time 468, transaction user think time 472, and application processing times 450, 452, 456, 460, 466, 470, 474, and 476. In the report of Appendix A, (i) user think time 454, (ii) send time 458, (iii) receive time 462, (iv) send/receive time 464, (v) review time 468, (vi) transaction user think time 472, and (vii) the sum of application processing times 450, 452, 456, 460, 466, 470, 474, and 476 are reported to the system evaluator. Thus, substantially all of the time elapsing during the event shown in FIG. 4 is reported to the system evaluator.

While the event represented in time line 400 (FIG. 4) includes execution of only a single send computer instruction and a single receive computer instruction, it is appreciated that an event can include multiple send and receive computer instructions to represent more complex events. In addition, events and transactions can be nested within RTE process 210A. For example, begin and end event computer instructions which initiate and terminate, respectively, a first event can be included between begin and end event computer instructions which initiate and terminate, respectively, a second event. The first event is therefore an event component of the second event. Transactions can be nested in an analogous manner. Furthermore, a transaction can be included in an event as a component of the event and an event can be included as a component of a transaction. The developer of RTE process 210A is provided with substantial flexibility in categorizing the various event components to provide useful information regarding the performance of SUT 100.

The above description is illustrative only and is not limiting. Instead, the present invention is limited only by the claims which follow.

APPENDIX A

Run Started 21:04:44, Ended 22:20:05
Only considering transactions between 21:18 and 22:18
No. of users=64

| Major Event | | Count | Total=(Review | +Think+ | TranTh+ | Appln+ | SendRecv) | SendRecv= Send + Recv | |
|---|---|---|---|---|---|---|---|---|---|
| glupd | | 71 | 484.58 | 57.72 | 274.97 | 0.00 | 0.60 | 151.29 | 122.76 | 28.31 |
| | Std.Dev | | 250.55 | 24.10 | 171.26 | 0.00 | | 78.91 | 68.76 | 15.17 |
| | C.O.V. | | 0.52 | 0.42 | 0.62 | 0.00 | | 0.52 | 0.56 | 0.54 |
| | Low | | 179.51 | 30.28 | 80.78 | 0.00 | | 53.46 | 46.13 | 7.26 |
| | 90%ile | | 931.65 | 91.16 | 581.47 | 0.00 | | 283.33 | 243.13 | 46.94 |
| | High | | 1002.06 | 173.80 | 636.12 | 0.00 | | 311.51 | 263.62 | 76.15 |
| | Details (each event may include more than one of each type): | | | | | | | | | |
| | Number | | | 71 | 13036 | 0 | | 13036 | 13036 | 13036 |
| | Averge | | | 57.72 | 1.50 | 0.00 | | 0.82 | 0.67 | 0.15 |
| | Std.Dev | | | 24.10 | 1.45 | 0.00 | | 1.12 | 0.55 | 0.98 |
| | C.O.V. | | | 0.42 | 0.97 | 0.00 | | 1.36 | 0.83 | 6.33 |
| | Low | | | 30.28 | 0.00 | 0.00 | | 0.20 | 0.19 | 0.00 |
| | High | | | 173.80 | 7.50 | 0.00 | | 44.57 | 5.00 | 43.98 |
| glbat | | 54 | 188.97 | 120.13 | 22.34 | 0.00 | 0.06 | 46.44 | 41.29 | 5.12 |
| | Std.Dev | | 66.17 | 58.53 | 8.71 | 0.00 | | 15.30 | 14.20 | 3.03 |
| | C.O.V. | | 0.35 | 0.49 | 0.39 | 0.00 | | 0.33 | 0.34 | 0.59 |
| | Low | | 112.99 | 60.55 | 5.35 | 0.00 | | 26.50 | 24.08 | 1.80 |
| | 90%ile | | 262.01 | 193.78 | 35.30 | 0.00 | | 69.25 | 61.69 | 9.71 |
| | High | | 443.57 | 343.07 | 39.02 | 0.00 | | 77.25 | 67.76 | 17.23 |
| | Details (each event may include more than one of each type): | | | | | | | | | |
| | Number | | | 54 | 1256 | 0 | | 953 | 1256 | 953 |
| | Averge | | | 120.13 | 0.96 | 0.00 | | 2.23 | 1.78 | 0.29 |
| | Std.Dev | | | 58.53 | 0.94 | 0.00 | | 2.30 | 1.79 | 0.74 |
| | C.O.V. | | | 0.49 | 0.98 | 0.00 | | 1.03 | 1.01 | 2.55 |
| | Low | | | 60.55 | 0.00 | 0.00 | | 0.33 | 0.32 | 0.00 |
| | High | | | 343.07 | 5.00 | 0.00 | | 18.51 | 10.35 | 8.41 |
| glinq | | 100 | 1084.99 | 841.58 | 113.47 | 0.00 | 0.25 | 129.69 | 100.32 | 29.30 |
| | Std.Dev | | 165.17 | 154.73 | 30.64 | 0.00 | | 25.52 | 23.48 | 7.52 |
| | C.O.V. | | 0.15 | 0.18 | 0.27 | 0.00 | | 0.20 | 0.23 | 0.26 |
| | Low | | 799.21 | 575.64 | 49.95 | 0.00 | | 78.15 | 43.62 | 14.71 |
| | 90%ile | | 325.511 | 025.61 | 159.96 | 0.00 | | 165.46 | 128.03 | 38.10 |
| | High | | | 667.41 | 1368.12 | 187.18 | 0.00 | 184.57 | 148.75 | 57.62 |

APPENDIX A-continued

Run Started 21:04:44, Ended 22:20:05
Only considering transactions between 21:18 and 22:18
No. of users=64

| Major Event | | Count Total=(Review +Think+TranTh+Appln+SendRecv) | | | | | SendRecv= Send + Recv | |
|---|---|---|---|---|---|---|---|---|
| | Details (each event may include more than one of each type): | | | | | | | |
| | Number | | 700 | 5748 | 0 | | 5748 | 5748 | 5748 |
| | Averge | | 120.23 | 1.97 | 0.00 | | 2.26 | 1.75 | 0.51 |
| | Std.Dev | | 58.33 | 1.91 | 0.00 | | 1.67 | 0.82 | 1.23 |
| | C.O.V. | | 0.49 | 0.97 | 0.00 | | 0.74 | 0.47 | 2.41 |
| | Low | | 60.21 | 0.00 | 0.00 | | 0.33 | 0.33 | 0.00 |
| | High | | 360.00 | 10.00 | 0.00 | | 43.55 | 4.59 | 41.57 |
| Jnl Inquiry | 479 | 15.01 | 0.00 | 5.66 | 0.00 | 0.01 | 9.34 | 6.61 | 2.72 |
| | Std.Dev | 3.84 | 0.00 | 3.13 | 0.00 | | 2.37 | 0.08 | 2.37 |
| | C.O.V. | 0.26 | 0.00 | 0.55 | 0.00 | | 0.25 | 0.01 | 0.87 |
| | Low | 8.85 | 0.00 | 0.18 | 0.00 | | 7.46 | 5.61 | 0.86 |
| | 90%ile | 19.76 | 0.00 | 9.79 | 0.00 | | 10.76 | 6.65 | 4.13 |
| | High | 51.64 | 0.00 | 17.56 | 0.00 | | 48.40 | 7.10 | 41.80 |
| | Details (each event may include more than one of each type): | | | | | | | |
| | Number | | 0 | 1437 | 0 | | 1437 | 1437 | 1437 |
| | Averge | | 0.00 | 1.89 | 0.00 | | 3.11 | 2.20 | 0.91 |
| | Std.Dev | | 0.00 | 1.84 | 0.00 | | 1.76 | 0.83 | 1.72 |
| | C.O.V. | | 0.00 | 0.97 | 0.00 | | 0.57 | 0.37 | 1.90 |
| | Low | | 0.00 | 0.00 | 0.00 | | 1.47 | 1.32 | 0.00 |
| | High | | 0.00 | 10.00 | 0.00 | | 43.55 | 3.76 | 41.57 |
| Qpick Standard | 3019 | 2.51 | 0.00 | 1.62 | 0.00 | 0.00 | 0.88 | 0.87 | 0.01 |
| | Std.Dev | 1.68 | 0.00 | 1.61 | 0.00 | | 0.35 | 0.35 | 0.02 |
| | C.O.V. | 0.67 | 0.00 | 0.99 | 0.00 | | 0.40 | 0.41 | 2.53 |
| | Low | 0.60 | 0.00 | 0.00 | 0.00 | | 0.59 | 0.59 | 0.00 |
| | 90%ile | 4.73 | 0.00 | 3.77 | 0.00 | | 1.35 | 1.34 | 0.05 |
| | High | 11.70 | 0.00 | 10.00 | 0.00 | | 1.99 | 1.77 | 1.39 |
| | Details (each event may include more than one of each type): | | | | | | | |
| | Number | | 0 | 13019 | 0 | | 13019 | 13019 | 13019 |
| | Averge | | 0.00 | 1.62 | 0.00 | | 0.88 | 0.87 | 0.01 |
| | Std.Dev | | 0.00 | 1.61 | 0.00 | | 0.35 | 0.35 | 0.02 |
| | C.O.V. | | 0.00 | 0.99 | 0.00 | | 0.40 | 0.41 | 2.53 |
| | Low | | 0.00 | 0.00 | 0.00 | | 0.59 | 0.59 | 0.00 |
| | High | | 0.00 | 10.00 | 0.00 | | 1.99 | 1.77 | 1.39 |

Total Send/Receive pairs = 31532, Ave.time = 1.24

What is claimed is:

1. A method for emulating use of a computer system under test by a human user through a remote terminal, the method comprising:

recording a think start time;

substantially immediately thereafter and for a period of a user think time having a predetermined duration, suspending transmission of input data to the computer system under test to simulate a period of time during which a simulated user thinks;

thereafter recording a think end time independently of the predetermined duration of the period of user think time; and measuring an amount of time during which user think time is simulated as a calculated difference between the think end time and the think start time.

2. The method of claim 1 further comprising:

reporting the calculated difference between the think end time and the think start time.

3. A remote terminal emulator comprising:

a network access device for transmitting data to and receiving data from a system under test;

a data sender, operatively coupled to the network access device, for transmitting input data to the system under test to simulate use of the system under test by a human user;

a think timer, operatively coupled to the data sender, for measuring a user think time by:

recording a think start time;

substantially immediately thereafter and for a period of a user think time having a predetermined duration, suspending transmission of input data to the computer system under test to simulate a period of time during which a simulated user thinks;

thereafter recording a think end time independently of the predetermnined duration of the period of user think time; and measuring the user think time as a calculated difference between the think end time and the think start time.

4. The remote terminal emulator of claim 3 further comprising:

a user think time reporter, operatively coupled to the think timer, for reporting the measured user think time.

5. A computer-readable memory including computer instructions which, when executed by a computer processor, emulate use of a computer system under test by a human user through a remote terminal, the memory comprising:

computer instructions configured to record a think start time;

computer instructions configured to, substantially immediately thereafter and for a period of a user think time having a predetermined duration, suspend transmission of input data to the computer system under test to simulate a period of time during which a simulated user thinks;

computer instructions configured to thereafter record a think end time independently of the predetermined duration of the period of user think time; and computer instructions configured to measure an amount of time during which user think time is simulated as a calculated difference between the think end time and the think start time.

6. The memory of claim 5 further comprising:

computer instructions configured to report the calculated difference between the think end time and the think start time.

7. A computer system comprising:

a network access device for transmitting data to and receiving data from a system under test;

a remote terminal emulator comprising:

a data sender, operatively coupled to the network access device, for transmitting input data to the system under test;

a think timer, operatively coupled to the data sender, for measuring a user think time by:

recording a think start time;

substantially immediately thereafter and for a period of a user think time having a predetermined duration, suspending transmission of input data to the computer system under test to simulate a period of time during which a simulated user thinks;

thereafter recording a think end time independently of the predetermined duration of the period of user think time; and measuring the user think time as a calculated difference between the think end time and the think start time.

8. The computer system of claim 7 wherein the remote terminal emulator further comprises:

a user think time reporter, operatively coupled to the think timer, for reporting the measured user think time.

* * * * *